(12) United States Patent
Byrne et al.

(10) Patent No.: US 11,873,751 B2
(45) Date of Patent: Jan. 16, 2024

(54) SYSTEM AND METHOD FOR MONITORING LOCATION OF DIESEL EXHAUST FLUID IN A DOSING SYSTEM

(71) Applicant: Caterpillar Inc., Peoria, IL (US)

(72) Inventors: Steven Paul Byrne, Peoria, IL (US); Shivsinh Hitendrasinh Parmar, Dunlap, IL (US); Hrishi Lalit Shah, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 69 days.

(21) Appl. No.: 17/097,754

(22) Filed: Nov. 13, 2020

(65) Prior Publication Data

US 2022/0154614 A1 May 19, 2022

(51) Int. Cl.
*F01N 3/20* (2006.01)

(52) U.S. Cl.
CPC .......... *F01N 3/208* (2013.01); *F01N 2610/02* (2013.01); *F01N 2610/144* (2013.01); *F01N 2610/1473* (2013.01)

(58) Field of Classification Search
CPC ............. F01N 2610/02; F01N 2610/08; F01N 2610/144; F01N 2610/1473; F01N 2900/1808; F01N 3/2066; F01N 3/208; F01N 9/00; Y02T 10/12; Y02T 10/40
See application file for complete search history.

(56) References Cited

U.S. PATENT DOCUMENTS

| 7,901,190 | B2 | 3/2011 | Gray |
| 9,605,664 | B2 | 3/2017 | Seith |
| 10,054,115 | B2 | 8/2018 | Seith |
| 10,668,212 | B2 | 6/2020 | Neftel et al. |
| 2010/0005871 | A1* | 1/2010 | Kitazawa ................. F01N 3/206 60/295 |
| 2011/0047972 | A1* | 3/2011 | Bauer ................. B01D 53/9409 60/287 |
| 2011/0107742 | A1* | 5/2011 | Igarashi .................. F01N 3/208 60/303 |
| 2014/0061333 | A1* | 3/2014 | Hao ...................... F01N 3/2066 239/302 |
| 2014/0260216 | A1 | 9/2014 | Everard et al. |

(Continued)

FOREIGN PATENT DOCUMENTS

CN           205262723          5/2016

*Primary Examiner* — Phutthiwat Wongwian
*Assistant Examiner* — Diem T Tran
(74) *Attorney, Agent, or Firm* — Lee & Hayes, P.C.

(57) ABSTRACT

A system including a pump fluidly connected to a fluid reservoir, the pump configured to direct diesel exhaust fluid (DEF) from the fluid reservoir to an injector fluidly connected to the pump via a flow line. The system also includes a first pressure sensor configured to determine fluid pressure at a first location in the flow line between the pump and the injector and a second pressure sensor configured to determine fluid pressure at a second location in the flow line between the pump and the injector. The system further includes an air source coupled to the injector via an air flow line, the air source configured to direct air to the injector via the air flow line and a controller communicatively coupled to the first pressure sensor, the second pressure sensor, and the air source, the controller configured to diagnose the system.

16 Claims, 3 Drawing Sheets

(56) References Cited

U.S. PATENT DOCUMENTS

2015/0308317 A1* 10/2015 Ohno .................. F01N 9/00
                                                              60/274
2018/0028974 A1    2/2018  Lindahl
2018/0128142 A1    5/2018  Collins et al.

* cited by examiner

SYSTEM AND METHOD FOR MONITORING LOCATION OF DIESEL EXHAUST FLUID IN A DOSING SYSTEM

TECHNICAL FIELD

The present disclosure relates to a diesel exhaust fluid (DEF) system. More specifically, the present disclosure relates to a system that identifies a location of DEF in an exhaust aftertreatment system.

BACKGROUND

Combustion engines implement various types of emission control systems. Specifically, diesel engines often include emission control systems designed to reduce emissions of nitrogen oxides. Such emission control systems can include a selective catalytic reduction (SCR) system. In some emission control systems, a reductant fluid is injected into an exhaust stream upstream of the SCR system. The reductant can include an aqueous urea solution, such as DEF. When the DEF is injected into the exhaust stream, thereby providing ammonia to exhaust gas, the DEF reacts with the exhaust gas at the SCR system to produce nitrogen gas and water.

Such systems can significantly reduce emissions of nitrogen oxides into the environment. However, DEF is prone to dehydration and crystallization. Thus, DEF crystals can form in the DEF system, thereby blocking various flow lines or a DEF injector. Furthermore, DEF can flow into portions of the DEF system or other portions of an emission control system due to DEF build up or other reasons. The crystallization of DEF and/or the flow of DEF in undesired regions of the DEF system can hinder performance of the DEF system and, in some instances, can cause failure of the DEF system. Therefore, it is desirable to track the location of DEF in a DEF system, and monitor the performance of the DEF system and the various components thereof.

An example system for diagnosing a reductant delivery system is described in U.S. Patent Application No. 2014/0260216 (hereinafter referred to as the '216 application). The '216 application describes a system and method for determining whether there are blockages present in a reductant delivery system. For example, the '216 application describes comparing pressure differentials under various operating conditions in order to determine whether blockages are present in various components of the reductant delivery system. The system described in the '216 application may then determine whether blockages are present in an injector or a dosing line of the reductant delivery system based on such pressure differentials. However, the system described in the '216 application is not configured to determine whether various valves in a reductant dosing system are operating properly, whether reductant is present in an air assist line, or whether a reductant pump is over priming, among other determinations. As a result, the system described in '216 application can be prone to failure since the system determines whether there are blockages in locations where reductant fluid should be present, but is not arranged to determine whether reductant fluid is present in areas of the system where such fluid should not be present.

Example embodiments of the present disclosure are directed toward overcoming the deficiencies described above.

SUMMARY

An example diesel exhaust fluid (DEF) delivery system includes a pump fluidly connected to a fluid reservoir, the pump configured to direct diesel exhaust fluid (DEF) from the fluid reservoir to an injector fluidly connected to the pump via a flow line. The DEF delivery system also a first pressure sensor configured to determine fluid pressure at a first location in the flow line between the pump and the injector and a second pressure sensor configured to determine fluid pressure at a second location in the flow line between the pump and the injector. The DEF delivery system further includes an air source coupled to the injector via an air flow line, the air source configured to direct air to the injector via the air flow line and a controller communicatively coupled to the first pressure sensor, the second pressure sensor, and the air source, the controller being configured to execute instructions stored in a memory associated with the controller which, when executed, cause the controller to cause a first valve fluidly connected to the air source to transition to a first open state, the first valve permitting air to flow from the air source to the injector in the first open state. The controller is further configured to receive first pressure data from the first pressure sensor, the first pressure data indicative of a first fluid pressure at the first location while the first valve is in the first open state determine that the first fluid pressure is within a predetermined pressure range. Based at least in part on determining that the first fluid pressure is within the predetermined pressure range the controller is configured to cause a second valve to transition to a second open state, the second valve being fluidly connected to the pump and the fluid reservoir, and configured to permit DEF to flow from the pump to the fluid reservoir in the second open state. The controller further receives second pressure data from the second pressure sensor, the second pressure data indicative of a second fluid pressure at the second location while the second valve is in the second open state and determines that the second fluid pressure is less than the first fluid pressure. Based at least in part on determining that the second fluid pressure is less than the first fluid pressure, the controller causes the first valve to transition to a first closed state, the first valve prohibiting air to flow from the air source to the injector in the first closed state and the pump to operate for an amount of time, while the second valve is in the second open state.

An example method of includes receiving, by a controller, pressure data from one or more pressure sensors, causing, via the controller, a first valve to transition to a first open state permitting air to flow from an air source through an air flow line to an injector, the first valve being fluidly connected to the air source via the air flow line, and determining, via the controller and from the pressure data, a first fluid pressure at a first location in a first flow line downstream of a pump, the pump being fluidly connected to a fluid reservoir and configured to pump diesel exhaust fluid (DEF) to the injector which is fluidly connected to the pump via the first flow line. The method further includes determining, via the controller, that the first fluid pressure is within a predetermined pressure range. Based at least in part on determining that the first fluid pressure is within the predetermined pressure range, the method includes causing a second valve to transition to a second open state, the second valve being fluidly connected to the pump and the fluid reservoir and configured to permit DEF to flow from the pump to the fluid reservoir in the second open state. The method further includes determining, via the controller and from the pressure data, a second fluid pressure at a second location, determining that the second fluid pressure is less than the first fluid pressure. Based at least in part on determining that the second fluid pressure is less than the first fluid pressure, the method further includes causing the first valve to transition to a first closed state prohibiting air to flow from the air source to the injector, and causing the pump to operate for an amount of time while the second valve remains in the second open state.

An first system is configured to deliver diesel exhaust fluid (DEF) to a second system, the second system being configured to treat exhaust received from an internal combustion engine, the first system comprising an injector configured to receive DEF and to direct the DEF to the second system, and a pump fluidly connected to a fluid reservoir, the pump configured to direct DEF from the fluid reservoir to the injector. The first system further includes a pressure sensor disposed at a first location downstream of the pump, the pressure sensor being configured to generate pressure data indicative of fluid pressure at the first location, and a controller communicatively coupled to the pressure sensor and configured to receive pressure data from the pressure sensor, the controller being configured to execute instructions stored in a memory associated with the controller which, when executed, cause the controller to determine, from the pressure data, a first fluid pressure at the first location while the pump is inoperative. The controller is further configured to determine, from the pressure data, a second fluid pressure at the first location, determine that the second fluid pressure is equal to or less than the first fluid pressure, cause the pump to operate for an amount of time while the return valve remains in the open based at least in part on determining that the second fluid pressure is equal to or less than the first fluid pressure, and cause the return valve to transition to a closed state after the pump operates for the amount of time.

DETAILED DESCRIPTION

Figure 1:
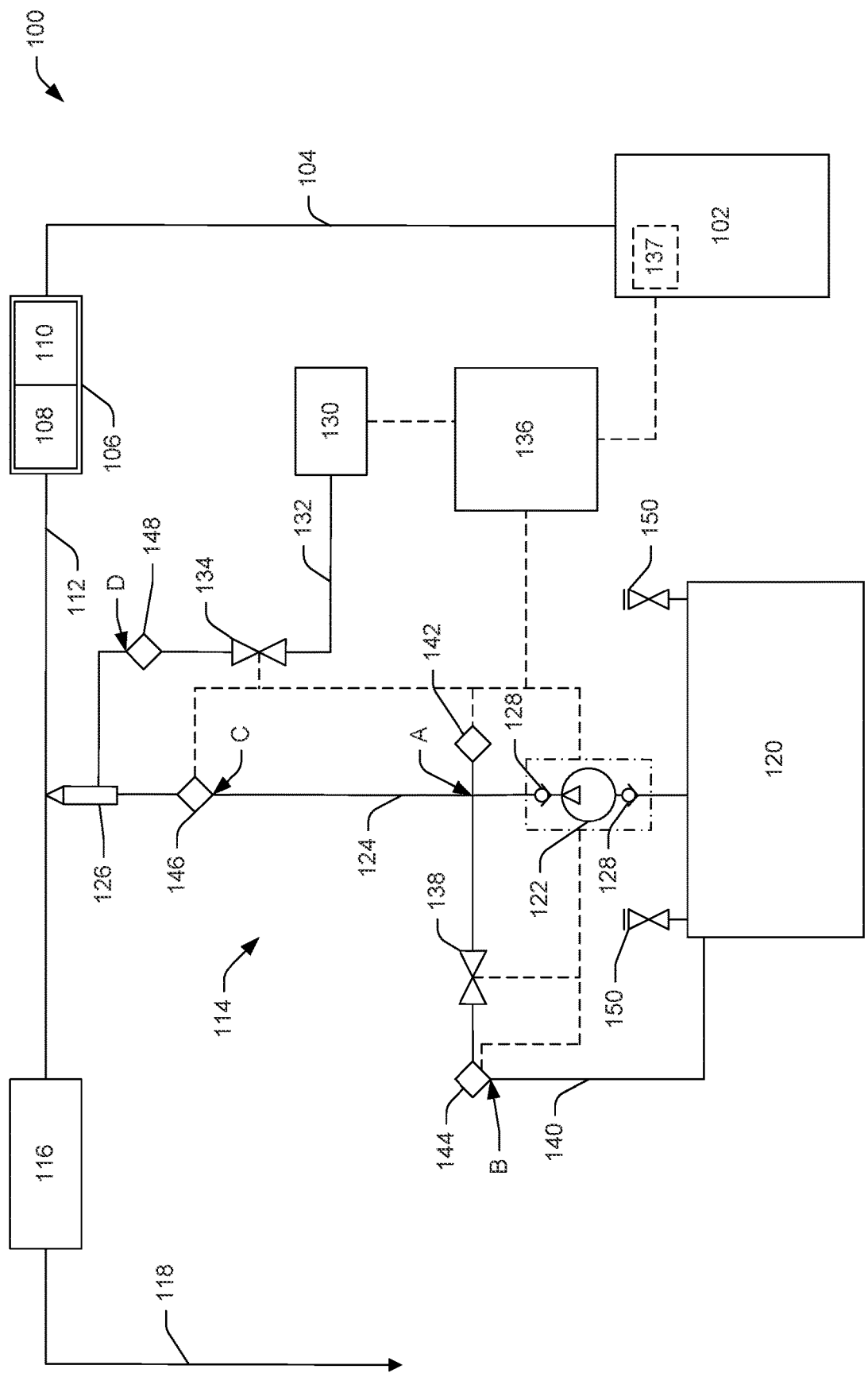
FIG. 1 is a schematic diagram of an engine exhaust system having a diesel exhaust fluid delivery system in accordance with an example of the present disclosure.

Wherever possible, the same reference numbers will be used throughout the drawings to refer to the same or like parts. FIG. 1 depicts an example exhaust aftertreatment system 100. The exhaust aftertreatment system 100 shown in FIG. 1 is fluidly connected to and configured to receive exhaust gas from an engine 102. The engine 102 may be any type of internal combustion engine such as a diesel engine or a gas engine (i.e., spark-ignited combustion engine). However, for ease of explanation, the engine 102 and the exhaust aftertreatment system 100 will be described with respect to a diesel combustion engine. In some examples, the engine 102 is fluidly connected to the exhaust aftertreatment system 100 via an exhaust manifold 104.

The exhaust manifold 104 receives exhaust gas from cylinders in the engine 102 and delivers the exhaust gas to one or more components of the exhaust aftertreatment system 100. For example, exhaust gas collects within the exhaust manifold 104 which delivers the exhaust gas to a diesel particulate filter (DPF) 106. The DPF 106 is designed to remove diesel particulate matter from the exhaust gas of the engine 102. The DPF 106 includes a filter 108 configured to trap and store carbon particles as the carbon particles flow into the DPF 106. The filter 108 may include a wall-flow filter or any other type of particulate filter. In some examples, the DPF 106 further includes a catalyst such as a diesel oxidation catalyst (DOC) 110. The DOC 110 is a catalytic converter that is designed to convert nitrogen oxides (such as nitrogen monoxide) and oxygen into nitrogen dioxide (or other nitrogen oxides), as it passes through the DOC 110. As the nitrogen dioxide flows through the filter 108, the nitrogen dioxide reacts with the carbon trapped in the filter 108, thereby producing carbon dioxide and nitrogen oxides (such as nitrogen monoxide), among other potential byproducts of the reaction. The converted exhaust gases then flow through the exhaust aftertreatment system 100 via an exhaust pipe 112. In some examples, the DPF 106 and/or components thereof (the filter 108 and the DOC 110) may be omitted from the exhaust aftertreatment system 100.

The example exhaust aftertreatment system 100 shown in FIG. 1 further includes a diesel exhaust fluid (DEF) system 114. The DEF system 114 is designed to spray DEF into the exhaust gas stream. DEF is an aqueous urea solution that reacts with the exhaust gas in the exhaust pipe 112 to form ammonia. In the example shown in FIG. 1, the ammonia and nitrogen oxides may then travel to a selective catalytic reduction (SCR) catalyst 116 disposed downstream of the DPF 106. The SCR catalyst 116 reduces the ammonia and nitrogen oxides thereby forming nitrogen and water vapor (among other possible byproducts of the reaction). By such a process, the exhaust aftertreatment system 100 reduces emissions that exit the exhaust aftertreatment system 100 via a tailpipe 118 or other exhaust pipe.

While the exhaust aftertreatment system 100 may significantly reduce emissions of nitrogen oxides into the environment, DEF may be prone to dehydration and crystallization in the exhaust aftertreatment system 100. Therefore, the example DEF systems 114 described herein are designed to determine whether various valves in the DEF system 114 are operating properly, whether DEF is present in an air assist line, and/or whether a DEF pump is over priming, among other determinations. These and other features of the example DEF system 114 are described herein below. While describing the DEF system 114 as providing DEF in the exhaust aftertreatment system 100, the DEF system 114 may also handle other additives that may be provided in an exhaust aftertreatment process.

The DEF system 114 includes a DEF reservoir 120. The DEF reservoir 120 may include a tank or container that stores DEF (or other reductant fluid) therein. As mentioned previously, DEF may be an aqueous urea solution. However, in some examples, DEF may include any reductant that may be sprayed or otherwise provided to the exhaust gas stream in the exhaust aftertreatment system 100 to reduce emissions or otherwise treat the exhaust gas. The DEF system 114 includes a pump 122 that is fluidly connected to the DEF reservoir 120 via DEF flow line(s) 124 of the DEF system 114. The pump 122 draws DEF from the DEF reservoir 120 and pumps DEF to an injector 126, where DEF is injected into the exhaust stream in the exhaust pipe 112. The pump 122 may include any type of fluid pump including, but not limited to, a centrifugal pump, gear pump, vane pump, hose pump, multiplex pump, air driven intensifier, lobe pump, diaphragm pump, or other type of fluid pump. In some examples, the DEF system 114 may include multiple pumps.

As shown in FIG. 1, the DEF system 114 may include one or more check valves 128. The check valves 128 may be included as part of a pump assembly or may be separate from the pump assembly while being fluidly connected to the pump 122 via DEF flow lines 124. The check valves 128 allow fluid to flow in a single direction while preventing backflow of DEF in the DEF system 114. For example, the check valves 128 may allow DEF to flow in a direction from the DEF reservoir 120 towards the injector 126, while preventing flow in the opposite direction. As such, the check valves 128 may assist the DEF system 114 in a pump priming process, or other pumping processes as are described further herein. For example, the pump 122 may draw DEF from the DEF reservoir 120, through at least one check valve 128, and into the pump 122. If the pump 122 is powered down or otherwise changes operation, the check valve 128 prevents the DEF from flowing back into the DEF reservoir 120 and may retain DEF in the pump 122. By such a process, the pump 122 is prepared to pump DEF in a dosing operation (e.g., injecting a specified amount of DEF into the exhaust gas stream) and is not required to prime prior to each dosing cycle. The check valves 128 may be any type of check valve including, but not limited to, ball check valve, swing check valve, lift check valve, wafer check valve, plug check valve, etc.

As mentioned previously, the pump 122 pumps DEF from the DEF reservoir 120 to the injector 126 where the injector 126 injects DEF into the exhaust gas stream. In some examples, the injector 126 may be fluidly connected to an air source 130 via an air flow line 132. The air source 130 may include a compressor or other component that compresses or pressurizes the air prior to providing the air to the injector 126. The air source 130 may be configured to provide compressed air (or other gas) to the injector 126, thereby assisting the injector 126 to atomize DEF as the DEF is injected into the exhaust gas stream. In some examples, the injector 126 may include an aperture (or other port) in the injector body that receives the compressed air from the air source 130 such that the air and DEF mix in the body of the injector 126 prior to injection in the exhaust gas stream. However, in some examples, the air source 130 may provide compressed air to the DEF flow line 124 (or other portion of the DEF system 114) upstream of the injector 126. As shown in FIG. 1, the DEF system 114 may include an air valve 134 that controls the supply of air to the injector 126. For example, when the air valve 134 is in a closed state, air is prohibited from flowing to the injector 126. However, when the air valve 134 is in an open state, air is permitted to flow from the air source 130 to the injector 126 (or other location). Operation of the air valve 134 and/or the air source 130 may be controlled by a controller 136.

The controller 136 is configured to control at least a portion of the operations of the DEF system 114 and/or the exhaust aftertreatment system 100. The controller 136 may be, for example, a hardware electronic control module (ECM) or other electronic control unit (ECU). The controller 136 includes, for example, a microcontroller, memory (e.g., RAM), storage (e.g., EEPROM or Flash) configured to perform the described functions of the controller 136. The controller 136 controls at least a portion of the operations of the DEF system including operation of the pump 122, the air source 130, the various valves (including air valve 134) of the DEF system 114 and/or other components of the DEF system 114 and/or the exhaust aftertreatment system 100. Instead of, or in addition to, an ECM/ECU the controller 136 may include a general computer microprocessor configured to execute computer program instructions (e.g., an application) stored in memory to perform the disclosed functions of the controller 136. As mentioned, the controller 136 includes a memory, a secondary storage device, processor(s), and/or any other computing components for running an application. Various other circuits may be associated with controller 136 such as power supply circuitry, signal conditioning circuitry, or solenoid driver circuitry. In some examples, the controller 136 and/or a portion of components of the controller 136 may be located remotely from the DEF system 114 and may be communicatively coupled to the engine system 114.

As shown in FIG. 1, the controller 136 may be communicatively coupled to the various valves, sensors, pump, air source, and/or other components of the DEF system 114. The controller 136 may also be communicatively coupled to an engine controller 137 such as an ECM, various sensors, or components of the engine 102, and may receive engine data from the engine controller 137. The controller 136 may use such engine data to determine when to cause the pump 122 to provide DEF to the injector 126, when to open the air valve 134 to provide air to the injector 126, as well as other operations that are described further herein. Such operations of the controller 136 are described herein with respect to the DEF system 114. In some examples, the controller 136 of the DEF system 114 and the engine controller 137 may be separate controllers. However, in some examples, the controller 136 of the DEF system 114 may be configured to control at least a portion of the operations of the engine 102 and/or components thereof. Furthermore, in some examples, operation of the DEF system 114 and the engine 102 may be controlled by a single controller. Additionally, and/or alternatively, the engine controller 137 may be configured to control at least a portion of the operations of the DEF system 114 and/or components thereof. Still further, the exhaust aftertreatment system 100 may include additional or few controllers than are described herein.

In some examples, the pump 122 may be primed prior to a dosing operation (i.e., providing DEF into the exhaust gas stream). Priming the pump 122 causes fluid to be introduced into the pump 122 in order to prepare the pump 122 to pump DEF from the DEF reservoir 120 to the injector 126 during a dosing event. Furthermore, a pump priming process causes the check valves 128 to be wet with DEF fluid. Wetting the check valves 128 may improve operation of the check valves 128. During the priming process, the air valve 134 may be closed so that the pump 122 does not have to work against air pressure in the flow line 124. In some examples, the controller 136 controls operation of a priming process. For example, the controller 136 may be communicatively coupled to a return valve 138. The controller 136 causes the return valve 138 to open while causing the pump 122 to operate during the priming process. Pumping DEF via the pump 122 while the return valve 138 is in an open position causes DEF to flow from the pump 122, through a return flow line 140, and back into the DEF reservoir 120. The controller 136 causes the pump 122 to operate with the return valve 138 open until the pump 122 is primed. The controller 136 causes the pump 122 to operate at a priming pump rate during the pump priming process. The priming pump rate may be different than or the same as a dosing pump rate (i.e., the rate at which the pump operates to provide DEF to the injector 126). A pump rate refers to a volume of fluid that the pump 122 pumps per time unit. For example, the pump rate may be represented as cubic feet per second or any other volumetric unit of measure per time unit.

In some examples, the controller 136 may store information indicating an amount of time that the pump 122 must operate with the return valve open 138 in order to achieve a primed pump state (i.e., DEF being present in the pump 122). The amount of time may be determined based on parameters of the DEF system 114 such as a distance between the DEF reservoir 120 and the pump 122, a length of flow line 124 between the DEF reservoir 120 and the pump 122, a diameter of the flow line 124 between the DEF reservoir 120 and the pump 122, a capacity of the pump 122 per second, a safety factor (e.g., additional 1-2 seconds) among other factors. In some examples, the amount of time may be determined based on a bench test that is performed for the specific DEF system 114 and the amount of time may be stored in memory of the controller 136. Furthermore, the amount of time may be estimated on previous bench tests conducted on similar DEF systems and/or may be calculated based on the parameters of the DEF system 114. Once the controller 136 causes the pump 122 to pump DEF for the amount of time, the controller 136 causes the return valve 138 to close. When the pump 122 operates with the return valve 138 closed, the pump 122 will direct DEF to the injector 126.

Additionally, and/or alternatively, the controller 136 may prime the pump 122 based on pressure data received from one or more pressure sensors of the DEF system 114. For example, the controller 136 may cause the pump 122 to operate while the return valve 138 is open, thereby causing DEF to circulate through the return flow line 140 back to the DEF reservoir 120. The controller 136 may receive and monitor pressure data received from a first pressure sensor 142 during the pump priming process. The pressure data is indicative of pressure in at least a portion of the flow line 124 (e.g., a portion of the flow line proximate and downstream of the pump). For example, the first pressure sensor 142 determines fluid pressure in the flow line 124 at a first location (A). Once DEF is pumped through the pump 122, a pressure change is determined at the first pressure sensor 142. When the observed pressure at the first pressure sensor 142 reaches a predetermined threshold for the priming pump rate, the controller 136 determines that the pump 122 is primed. After the pump 122 is primed, the controller 136 causes the return valve 138 to close.

In some examples, once the pump 122 is primed, the controller 136 may determine whether DEF is present in any unwanted locations. For example, with the return valve 138 close, the controller 136 may receive pressure data indicative of pressure in the return flow line 140 from a second pressure sensor 144. For example, the second pressure sensor 144 determines fluid pressure in the return flow line 140 at a second location (B). If the controller 136 determines, from the pressure data received from the second pressure sensor 144, that the pressure in the return flow line 140 is above a predetermined threshold pressure (e.g., atmospheric or system pressure), the controller 136 may determine that there is a leak or hardware failure in the DEF system 114. For example, if the controller 136 determines that the pressure in the return flow line 140 is above the predetermined threshold pressure after the return valve 138 is closed, the controller 136 may determine that DEF is present in the return flow line 140 after the return valve 138 has been closed. This may be indicative of valve failure (e.g. the return valve 138 is functioning improperly), blockage due to crystallization (e.g., blockage in the return valve 138, return flow line 140, or flow line 124), or other DEF system 114 problem or failure. Such a system failure may result in a false-primed condition. In some examples, the controller 136 generates a diagnostic code indicating that the return valve 138 (or other portion) of the DEF system 114 is functioning improperly. The controller 136 may store the diagnostic code in memory of the controller 136 and/or may send the diagnostic code to an ECM where the diagnostic code may be stored.

Furthermore, the controller 136 may receive pressure data from a third pressure sensor 146 downstream of the pump 122. The third pressure sensor 146 may be proximate the injector 126 and thus, the pressure data is indicative of pressure at a third location (C) in the flow line 124 downstream of the pump 122 and proximate the injector 126. The controller 136 may receive and monitor the pressure data received from the third pressure sensor 146 during the priming process. If the controller 136 determines that the pressure in the flow line 124 at the third pressure sensor 146 is above a predetermined threshold pressure, the controller 136 may determine that DEF is present in the flow line 124 proximate the third pressure sensor 146. Such a determination is indicative of an over-primed pump 122. In other words, if the controller 136 determines that DEF is present in the flow line 124 proximate the third pressure sensor 146, the controller 136 may determine that the amount of time that the pump operates with the return valve 138 open may be too long such that DEF is flowing through the flow line 124 and may be reaching the injector 126. If the pump 122 is over-primed, it is possible that DEF may reach the injector 126 and crystalize therein. Furthermore, DEF could flow into the air flow line 132 and may crystalize therein. Thus, the controller 136 may determine whether the pump 122 is reaching an over-primed state to determine and/or prevent DEF from reaching unwanted locations of the DEF system 114.

In some examples, if the controller 136 determines that DEF is present at the third pressure sensor 146 during the pump priming process, the controller 136 may take corrective actions. For example, the controller 136 may turn the pump 122 off. Additionally, and/or alternatively, the controller 136 may open the air valve 134 causing air to flow into the injector 126 and/or the flow line 124. Such corrective actions may clear the injector 126 and/or the air flow line 132 of DEF and may reduce or prevent potential DEF blockage due to crystallization.

Furthermore, the controller 136 may receive pressure data from a fourth pressure sensor 148. In some examples, the fourth pressure sensor 148 is located at a fourth location (D) in the DEF system 114. The fourth location (D) may be downstream the air valve 134 in the air flow line 132. Thus, the pressure data received from the fourth pressure sensor 148 is indicative of pressure at the fourth location in the air flow line 132 downstream of the air valve 134. The controller 136 may receive and monitor the pressure data received from the fourth pressure sensor 148 during various operations (e.g., pump priming, dosing operation, etc.) of the DEF system 114. In some examples, the controller 136 monitors pressure data received from the fourth pressure sensor 148 as the air valve 134 is opened and closed to determine whether the air valve 134 and/or other components of the DEF system 114 are operating properly.

The controller 136 may further check to ensure that one or more reservoir vents 150 are operating properly. For example, the controller 136 may cause the air valve 134 and the return valve 138 to open while the pump 122 is not operating. The controller 136 may cause the air valve 134 and the return valve 138 to open for a predetermined amount of time, thereby causing the DEF reservoir 120 to be pressurized. Once the predetermined amount of time has lapsed, the controller 136 may cause the air valve 134 and the return valve 138 to close and may monitor the pressure observed at the second pressure sensor 144. If the pressure observed at the second pressure sensor 144 is greater than a predetermined threshold pressure after an amount of time, then the controller 136 may determine that the reservoir vents 150 are blocked. Such vent 150 blockage may cause hardware failures such as failing to effectively purge the DEF reservoir 120 and/or overfilling the DEF reservoir 120, among other potential failures.

Figure 2:
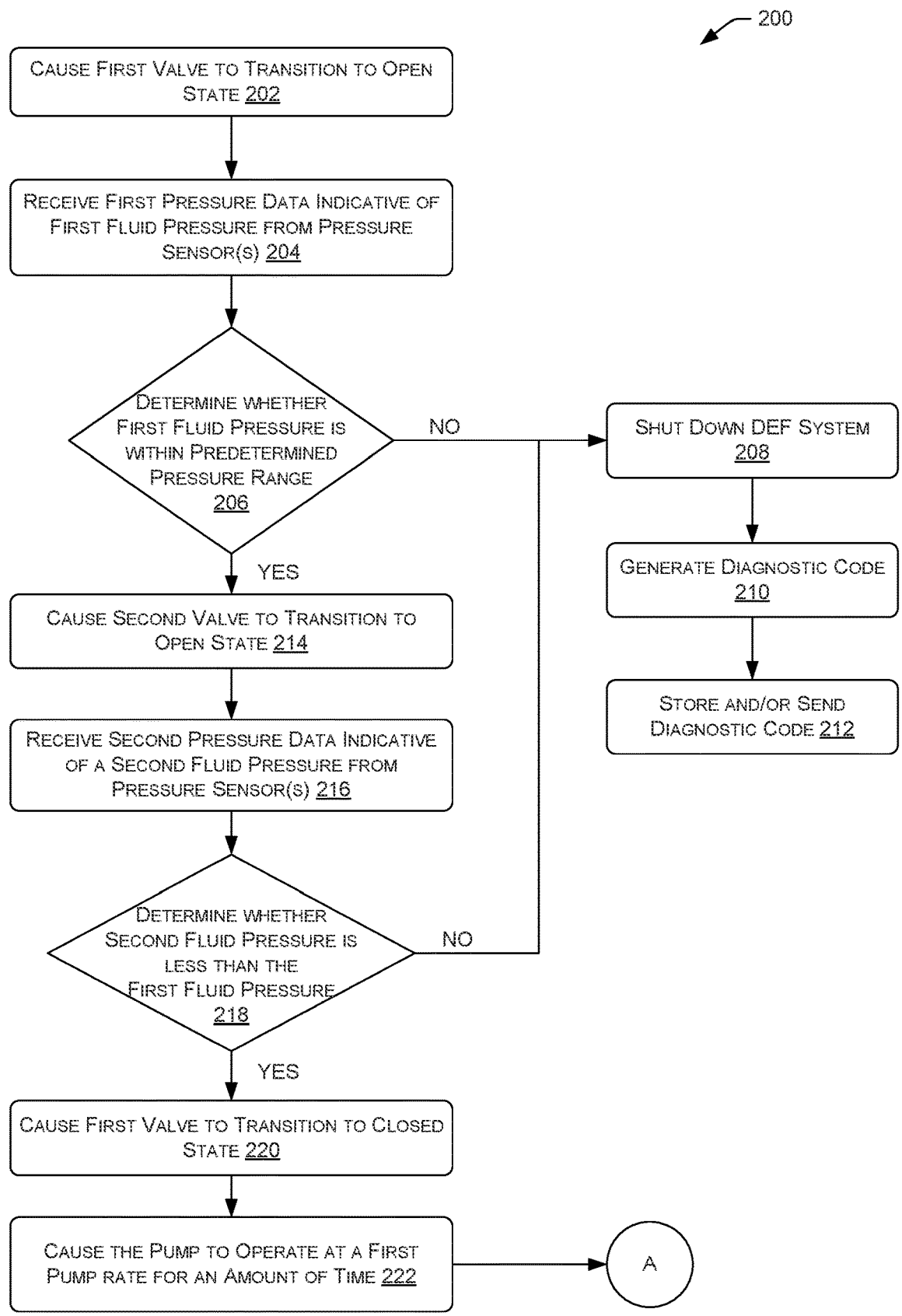
FIG. 2 illustrates a method of diagnosing an exhaust fluid delivery system in accordance with an example of the present disclosure.

FIG. 2 depicts an example method 200 of determining a location of DEF in the DEF system 114. The example method 200 is illustrated as a collection of steps in a logical flow diagram, which represents operations that may be implemented in hardware, software, or a combination thereof. In the context of software, the steps represent computer-executable instructions stored in memory. Such computer-executable instructions may include routines, programs, objects, components, data structures, and the like that perform particular functions or implement particular abstract data types. The order in which the operations are described is not intended to be construed as a limitation, and any number of the described steps may be combined in any order and/or in parallel to implement the process. For discussion purposes, and unless otherwise specified, the method 200 is described with reference to the controller 136, the exhaust aftertreatment system, the DEF system, and/or other components shown and described in FIG. 1. In particular and unless otherwise specified, the method 200 will be described with respect to the controller 136 for ease of description.

At 202, the controller 136 causes a first valve, such as the air valve 134, to transition to an open state. The controller 136 may cause the air valve 134 to transition to an open state while the pump 122 is not operating and/or the return valve 138 is closed. By transitioning the air valve 134 to the open state, air is allowed to flow from the air source 130 to the injector 126 or the flow line 124 proximate the injector 126. With the air valve 134 in the open state, air flows into the flow line 124 until the air flow terminates at the pump 122 and/or return valve 138. Such air flow cools the injector 126 prior to a dosing operation (i.e., injection of DEF into exhaust gas stream) which may reduce potential dehydration and/or crystallization of DEF in the injector 126. Furthermore, opening the air valve 134 may clear the air flow line 132 and/or the air valve 134 of any particulate matter, fluid (e.g., DEF, water, etc.), or any other matter that may be present in the air flow line 132.

At 204, the controller 136 receives first pressure data from the first pressure sensor 142 and/or the third pressure sensor 146. The first pressure data is indicative of first fluid pressure (including air and/or liquid such as DEF) at a respective location of the first pressure sensor 142 and/or the third pressure sensor 146. In some examples, the controller 136 receives the first pressure data while the air valve 134 is in the open state. However, in some examples, the controller 136 may cause the air valve 134 to transition to a closed state prior to receiving the first pressure data.

At 206, the controller 136 determines whether the first fluid pressure is within a predetermined pressure range. In some examples, the predetermined pressure range is defined by a pressure range between and including a minimum fluid pressure and a maximum pressure. The predetermined pressure range may be stored in memory of the controller 136, in some examples. The predetermined pressure range may be determined based on bench tests for the DEF system 114 and may represent an expected fluid pressure range at the first pressure sensor 142 and/or the third pressure sensor 146 while the air valve 134 is in the open state, and the air source 130 is supplying air to the DEF system 114.

If, at 206, the controller 136 determines that the first fluid pressure is not within the predetermined pressure range (Step 206—No), at 208 the controller 136 shuts down the DEF system 114, at 208. In some examples, shutting down the DEF system 114 at 208 may include closing the air valve 134. Additionally, and/or alternatively, if the return valve 138 is open and/or if the pump 122 is operating, at 208 the controller 136 may transition the return valve 138 to a closed state and cause the pump 122 to cease operation. For example, the controller 136 may prevent the pump 122 from receiving power from a power supply via a switch, powering down the power supply, etc.

At 210, the controller 136 generates a diagnostic code. The diagnostic code that the controller 136 generates corresponds to a problem that is determined by the controller 136. For example, if the controller 136 determines, at 206, that the first fluid pressure is greater than a maximum pressure in the predetermined pressure range, the controller 136 generates a first diagnostic code indicating that the first fluid pressure is greater than the maximum pressure. However, if the controller 136 determines, at 206, that the first fluid pressure is less than a minimum pressure in the predetermined pressure range, the controller 136 generates a second diagnostic code indicating that the first fluid pressure is less than the minimum pressure.

Once the controller 136 generates the diagnostic code, the controller 136 may store the diagnostic code in memory of the controller 136, at 212. Additionally, and/or alternatively, the controller 136 may send the diagnostic code to an ECM that controls function of the engine 102 or other components of the system in which the DEF system 114 operates. However, if at 206, the controller 136 determines that the first fluid pressure is within the predetermined pressure range (Step 206—Yes), at 214 the controller 136 causes a second valve, such as the return valve 138, to transition to an open state. The controller 136 may cause the return valve 138 to transition to an open state in preparation for priming the pump 122. For example, as mentioned previously, the return valve 138 may be fluidly connected to the pump 122 and the DEF reservoir 120 such that DEF flows from the pump 122, through the return valve 138, and back to the DEF reservoir 120 when the pump operates 122, and while the return valve 138 is in the open state.

At 216, the controller 136 receives second pressure data from the first pressure sensor 142. The second pressure data is indicative of second fluid pressure at the location (A) of the first pressure sensor 142 once the controller 136 opens the return valve 138. Furthermore, in some examples, at 216, the controller 136 receives second pressure data from the first pressure sensor 142 while the air valve 134 remains open and the air source 130 is providing air to the DEF system 114. When the controller 136 opens the return valve 138, the first pressure sensor 142 should register a pressure drop if the DEF system 114 is operating properly. Thus, at 218, the controller 136 determines whether the second fluid pressure is less than the first fluid pressure. In some examples, the controller 136 may determine whether the second fluid pressure is substantially equal to atmospheric pressure at 218.

If, at 218, the controller 136 determines that the second fluid pressure is substantially equal to or greater than the first fluid pressure (Step 218—No), the controller 136 may proceed to steps 208-212. For example, based on determining that the second fluid pressure is not less than the first fluid pressure, the controller proceeds to 208 and shuts down (i.e., close any open valves and refrain from injecting DEF into exhaust gas stream) the DEF system 114. The controller 136 may also generate a diagnostic code indicating that the return valve 138 is not functioning properly at 210. Furthermore, the controller 136 may store the diagnostic code in memory thereof and/or send the diagnostic code to an ECM or other component at 212.

If, however, at 218, the controller 136 determines that the second fluid pressure is less than the first fluid pressure (Step 218—Yes), at 220 the controller 136 causes the air valve 134 to transition to a closed state (if the controller 136 had not previously closed the air valve). Causing the air valve 134 to transition to the closed state at 220 may prevent DEF from entering the air flow line 132, air valve 134, and/or air source 130 during pump priming (described below). At 222, the controller 136 causes the pump 122 to operate at a first pump rate for a an amount of time. In some examples, the first pump rate may include a priming pump rate that may be different than a dosing pump rate (i.e., a rate at which the pump 122 operates to inject DEF into the exhaust gas stream under normal operating conditions). However, the priming pump rate may be substantially similar to the dosing pump rate. Furthermore, as mentioned previously, the amount of time may correspond with a predetermined amount of time that the pump 122 must operate at the first pump rate with the return valve open 138 in order to achieve a primed pump state (i.e., DEF being present in the pump 122). Additionally, and/or alternatively, the controller 136 may prime the pump based on pressure data received from the first pressure sensor 142 and/or the second pressure sensor 144 as described previously.

Figure 3:
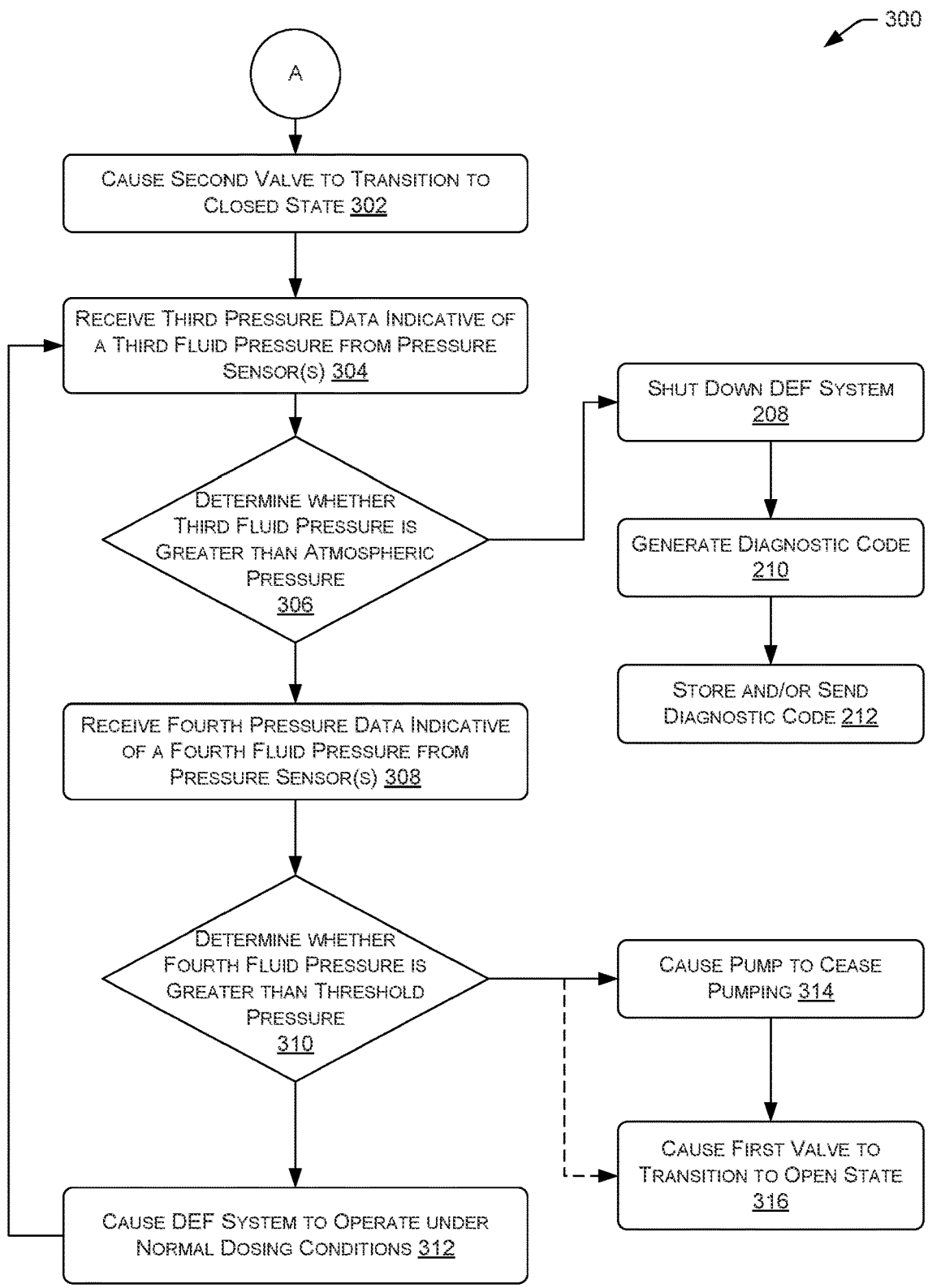
FIG. 3 illustrates a continuation of the method of diagnosing an exhaust fluid delivery system as shown and described in FIG. 2 in accordance with an example of the present disclosure.

The flow diagram 300 in FIG. 3 continues the illustration of the method 200. At 302, the controller 136 causes the second valve (i.e., the return valve 138) to transition to a closed state. In some examples, the controller 136 causes the return valve 138 to close once the pump 122 has been primed. The controller 136 may close the return valve 138 after the pump 122 has been primed for the predetermined amount of time or once the controller 136 receives pressure data indicating that the pump 122 has been primed, as described previously.

At 304, the controller 136 receives third pressure data from the second pressure sensor 144 once the return valve 138 has been closed. The third pressure data is indicative of third fluid pressure in the return flow line 140 once the return valve has been closed. Furthermore, in some examples, the controller 136 may receive pressure data from each pressure sensor in the DEF system at 304.

At 306, the controller 306 determines whether the third fluid pressure is substantially greater than atmospheric pressure. In some examples, the controller 136 determines whether the third fluid pressure is within a predefined tolerance of atmospheric pressure. The tolerance may account for any potential variations in atmospheric pressure based on region, elevation, temperature, elevation, or other factors. If, at 306, the controller 306 determines that the third fluid pressure is substantially greater than atmospheric pressure (Step 306—Yes), the controller 136 proceeds to steps 208-212. For example, based on determining that the third fluid pressure is greater than a predefined tolerance of atmospheric pressure, the controller proceeds to 208 and shuts down (i.e., close any open valves and refrain from injecting DEF into the exhaust gas stream) the DEF system 114. The controller 136 may also generate a diagnostic code indicating that the return valve 138 (or other valves if the pressure data indicates improper function of such valves) is not functioning properly or that there is a hardware failure in the return line 140, return valve 138, the pressure sensor 144, or the DEF reservoir 120 at 210. Furthermore, the controller 136 may store the diagnostic code in memory thereof and/or send the diagnostic code to an ECM or other component at 212. In some examples, if the third fluid pressure is substantially greater than atmospheric pressure when the return valve 138 is closed, the controller 136 may detect a false-primed pump 122 if the controller 136 primes the pump 122 based on pressure as described previously.

If, at 306, the controller 136 determines that the third fluid pressure is substantially equal to atmospheric pressure (i.e., within the predefined tolerance) (Step 306—No), the controller 136 receives fourth pressure data from the third pressure sensor 146, at 308. The fourth pressure data is indicative of fourth fluid pressure at the location of the third pressure sensor 146. In some examples, the controller 136 receives the fourth pressure data while the pump 122 is being primed or after the pump 122 is primed, but prior to a dosing operation (i.e., injecting DEF into the exhaust gas stream).

At 310, the controller 136 determines whether the fourth fluid pressure is greater than a threshold pressure. The threshold pressure may indicate an acceptable pressure in the flow line 124 at the location of the third pressure sensor 146 while the pump 122 is being primed. The threshold pressure may be determined based on the pump rate of the pump 122 during priming, a length of the flow line 124 between the pump 122 and the third pressure sensor, a diameter of the flow line 124, or other factors.

If, at 310, the controller 136 determines that the fourth fluid pressure is not greater than the threshold pressure (Step 310—No), the controller 136 causes the DEF system 114 to operate under normal dosing conditions, at 312. In other words, the controller 136 may cause the pump 122 to operate at a dosing pump rate and/or dosing interval and the air valve 134 to open and/or close at dosing intervals to provide air assist to the dosing operation, among other operations. As shown in FIG. 3, under normal dosing conditions, the controller 136 may continue to receive pressure data from the second pressure sensor 144 at 304 and may determine at 306 whether the fluid pressure at the second pressure sensor 144 is substantially greater than a pressure threshold (e.g., atmospheric pressure) while the DEF system 114 operates under normal dosing conditions at 312. Thereby, the controller 136 may determine whether the return valve 138 is operating properly (e.g., preventing fluid from flowing through the return flow line 140) while the DEF system operates under normal dosing conditions at 312.

However, if, at 310, the controller 136 determines that the fourth fluid pressure is greater than the threshold pressure (Step 310—Yes), the controller 136 may take corrective actions at 314 and/or 316. For example, the fourth fluid pressure being greater than the threshold pressure may be indicative of DEF being present at the location of the third pressure sensor 146 while the pump 122 is being primed, thus indicating an over-primed condition of the DEF system 114. Over-priming the DEF system 114 may cause DEF build-up in the pump 122, the injector 126, the exhaust pipe 112, or other locations if corrective steps are not taken. Additionally, and/or alternatively, over-priming the DEF system 114 may cause DEF to flow into the air line 132, the air valve 134, and/or the air source 130, which could block or otherwise damage the air assist system (e.g., the air line 132, the air valve 134, and the air source 130). At least partially in response to determining that the fourth fluid pressure is greater than the threshold pressure, the controller 136 cause the pump 122 to cease pumping at 314. Additionally, and/or alternatively, the controller 136 may cause the air valve 134 to open to cause air to flow from the air source 130 to the injector 126 and/or flow line 124, at 316. Opening the air valve 134 may prevent DEF from entering the air flow line 132 and/or may force any DEF in the injector 126 out of the injector 126, thereby reducing potential DEF build-up.

INDUSTRIAL APPLICABILITY

The present disclosure describes an exhaust aftertreatment system 100 having a DEF system 114 configured to provide DEF to an exhaust gas stream. The DEF system 114 includes a controller 136 that receives pressure data from sensors in the DEF system. The controller 136 diagnoses operation of the DEF system based on the pressure data. The controller 136 causes corrective actions in the DEF system 114 in response to determining that components or functions of the DEF system 114 are working improperly. The controller 136 generates and stores one or more diagnostic codes that indicate the components or functions of the DEF system 114 that are working improperly. Thus, the DEF system 114 includes a controller 136 that diagnoses the DEF system 114 and causes corrective actions when possible.

For example, the DEF system 114 is configured to determine whether the air valve 134 and the return valve 138 are functioning properly. The DEF system 114 may further determine whether there are leaks present in the air flow line 132, the flow line 124, and/or the return flow line 140. If the controller 136 determines that one or more of the air valve 134, the return valve 138, the air flow line 132, the flow line 124, and/or the return flow line 140 are functioning improperly, the controller 136 may shut down the DEF system 114 to prevent damage to the DEF system 114 or other portions of the exhaust aftertreatment system 100. Furthermore, the controller 136 monitors the presence of DEF during a pump priming procedure. If the controller 136 determines that DEF is present in portions of the DEF system 114 while the pump 122 is being primed, the controller 136 may take corrective action such as causing the pump 122 to cease operating and/or cause the air valve 134 to transition to an open state. As a result, the DEF system 114 and corresponding methods described herein are configured to reduce system failure due to DEF dehydration and crystallization, or other causes.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A first system configured to deliver a diesel exhaust fluid (DEF) to a second system, the second system being configured to treat exhaust received from an internal combustion engine, the first system comprising:
   an injector configured to receive the DEF and to direct the DEF to the second system;
   a pump fluidly connected to a fluid reservoir, the pump being configured to direct the DEF from the fluid reservoir to the injector via a DEF flow line;
   a pressure sensor disposed at a first location along the DEF flow line downstream of the pump, the pressure sensor being configured to generate pressure data indicative of fluid pressure at the first location;
   a controller communicatively coupled to the pressure sensor and configured to receive the pressure data from the pressure sensor, the controller being configured to execute instructions stored in a memory associated with the controller which, when executed, cause the controller to:
      determine, from the pressure data, a first fluid pressure at the first location while the pump is inoperative;
      cause a return valve to transition to an open state, the return valve being fluidly connected to the DEF flow line downstream of the pump and configured to effect fluid communication between the DEF flow line and the fluid reservoir when the return valve is in the open state;
      determine, from the pressure data, a second fluid pressure at the first location while the pump is inoperative and the return valve is in the open state;
      determine that the second fluid pressure is equal to or less than the first fluid pressure;
      cause the pump to operate for an amount of time while the return valve remains in the open state, based at least in part on determining that the second fluid pressure is equal to or less than the first fluid pressure; and
      cause the return valve to transition to a closed state after the pump operates for the amount of time.

2. The first system of claim 1, further comprising a check valve disposed along the DEF flow line between the fluid reservoir and an inlet to the pump, wherein operating the pump for the amount of time with the return valve in the open state causes the pump to draw DEF from the fluid reservoir and into the pump via the check valve.

3. The first system of claim 1, wherein causing the pump to operate with the return valve open causes DEF to flow from the pump to the fluid reservoir via a return flow line including the return valve.

4. The first system of claim 3, wherein the pressure data is first pressure data and the pressure sensor is a first pressure sensor and the instructions further cause the controller to:
   receive, from a second pressure sensor, second pressure data indicative of a third fluid pressure at a second location, the second location being disposed along the return flow line downstream of the return valve;
   determine, from the second pressure data, a third fluid pressure at the second location, wherein the third fluid pressure represents the pressure in the return flow line after the return valve has been closed;
   determine that the third fluid pressure is greater than a predetermined pressure; generate a diagnostic code indicating that at least a portion of the first system is functioning improperly based at least in part on determining that the third fluid pressure is greater than the predetermined pressure;
   store the diagnostic code in the memory associated with the controller; and
   cause the pump to cease operation based at least in part on generating the diagnostic code.

5. The first system of claim 1, further comprising an air source coupled to the injector via an air flow line, the air source being configured to provide air to the injector via the air flow line.

6. The first system of claim 5, wherein the open state is a first open state and the closed state is a first closed state, the controller is communicatively coupled to the air source, and the instructions further cause the controller to:
   prior to causing the return valve to transition to the first open state, cause an air valve to transition to a second open state permitting air to flow from the air source to the injector along the air flow line;

determine, from the pressure data, a fourth fluid pressure at the first location; determine that the fourth fluid pressure is outside of a predetermined pressure range;

generate a diagnostic code indicating that at least a portion of the first system is function improperly based at least in part on determining that the fourth fluid pressure is outside of the predetermined pressure range; and store the diagnostic code in the memory of the controller.

7. The first system of claim 1, wherein causing the pump to operate for the amount of time includes causing the pump to operate at a first pump rate, and the instructions further cause the controller to cause the pump to operate at a second pump rate once the pump operates at the first pump rate for the amount of time and the return valve is closed, wherein operating the pump at the second pump rate causes DEF to be pumped to the injector where the DEF is injected into the second system.

8. The first system of claim 1, wherein the pressure sensor is a first pressure sensor, the first system further comprising a second pressure sensor disposed at a second location along the DEF flow line downstream of the pump, the second pressure sensor being configured to generate pressure data indicative of fluid pressure at the second location, wherein the first location is disposed between the pump and the second location along the DEF flow line.

9. The first system of claim 8, wherein the second location is disposed proximate to the injector.

10. The first system of claim 9, further comprising a return flow line extending from an intersection of the return flow line with the DEF flow line downstream of the pump and extending to the fluid reservoir, wherein the first location is disposed at the intersection such that the first pressure sensor is configured to generate pressure data indicative of fluid pressure at the intersection.

11. The first system of claim 1, wherein the pressure sensor is a first pressure sensor, the first system further comprising a second pressure sensor disposed at a second location along the DEF flow line downstream of the pump, the second pressure sensor being configured to generate pressure data indicative of fluid pressure at the second location, wherein the second location is disposed between the first location and the injector.

12. The first system of claim 11, wherein the first location is disposed proximate to the pump.

13. The first system of claim 12, further comprising a return flow line extending from an intersection of the return flow line with the DEF flow line downstream of the pump and extending to the fluid reservoir, wherein the first location is disposed proximate to the intersection of the return flow line and the DEF flow line.

14. The first system of claim 6, wherein the instructions further cause the controller to cause the air valve to transition to a closed state in response to determining that the second fluid pressure is equal to or less than the first fluid pressure.

15. The first system of claim 6, further comprising a return flow line extending from an intersection of the return flow line with the DEF flow line downstream of the pump and extending to the fluid reservoir,
wherein the first location is disposed at the intersection of the return flow line with the DEF flow line such that the first pressure sensor is configured to generate pressure data indicative of fluid pressure at the intersection.

16. The first system of claim 15, wherein the pressure sensor is a first pressure sensor, the first system further comprising a second pressure sensor disposed at a second location along the DEF flow line downstream of the pump, the second pressure sensor being configured to generate pressure data indicative of fluid pressure at the second location, wherein the second location is disposed proximate the injector.

* * * * *